(12) United States Patent
Prendergast et al.

(10) Patent No.: US 8,044,612 B2
(45) Date of Patent: Oct. 25, 2011

(54) METHOD AND APPARATUS FOR NETWORKED ILLUMINATION DEVICES

(75) Inventors: Patrick N. Prendergast, Clinton, WA (US); Benjamin T. Kropf, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 956 days.

(21) Appl. No.: 11/811,108

(22) Filed: Jun. 7, 2007

(65) Prior Publication Data

US 2008/0180040 A1    Jul. 31, 2008

Related U.S. Application Data

(60) Provisional application No. 60/898,473, filed on Jan. 30, 2007.

(51) Int. Cl.
*H05B 37/00* (2006.01)
(52) U.S. Cl. ........ 315/318; 315/312; 315/360; 315/362; 315/297; 345/600; 345/601; 345/589; 345/690
(58) Field of Classification Search .................. 315/312, 315/318, 360, 362, 294, 297, 224, 149, 158; 362/227, 230, 231, 240, 236, 800; 345/44, 345/46, 82, 83, 690, 691, 589, 600, 601
See application file for complete search history.

(56) References Cited

U.S. PATENT DOCUMENTS

| | | |
|---|---|---|
| 3,582,882 A | 6/1971 | Titcomb et al. |
| 3,633,015 A | 1/1972 | Lee |
| 3,746,847 A | 7/1973 | Maritsas |
| 4,004,090 A | 1/1977 | Goto et al. |
| 4,253,045 A | 2/1981 | Weber |
| 4,571,546 A | 2/1986 | Wilkinson |
| 4,680,780 A | 7/1987 | Agoston et al. |
| 4,871,930 A | 10/1989 | Wong et al. |
| 4,973,860 A | 11/1990 | Ludwig |
| 5,001,374 A | 3/1991 | Chang |
| 5,065,256 A | 11/1991 | Suganuma et al. |
| 5,353,122 A | 10/1994 | Kim |
| 5,418,407 A | 5/1995 | Frenkil |
| 5,471,159 A | 11/1995 | Stuebing et al. |
| 5,522,048 A | 5/1996 | Offord |
| 5,760,609 A | 6/1998 | Sharpe-Geisler |
| 5,764,710 A | 6/1998 | Cheng et al. |
| 5,912,572 A | 6/1999 | Graf, III |
| 5,912,573 A | 6/1999 | Graf, III |
| 5,917,350 A | 6/1999 | Graf, III |
| 5,929,676 A | 7/1999 | Graf, III |
| 6,016,038 A | 1/2000 | Mueller et al. |
| 6,150,774 A | 11/2000 | Mueller et al. |
| 6,338,765 B1 | 1/2002 | Statnikov |
| 6,587,248 B1 | 7/2003 | Gyoten |
| 6,628,249 B1 * | 9/2003 | Kamikawa et al. ............. 345/44 |
| 6,630,801 B2 * | 10/2003 | Schuurmans ................. 315/307 |

(Continued)

OTHER PUBLICATIONS

Patrick Prendergast, Applications Engineer, Cypress Semiconductor Corp., "Thermal Design Considerations for High-Power LED Systems", http://www.automotivedesignline.com/howto/197700496;jsessionid=PJRTJPQ3NPS4SQS, Automotive Design Line, Feb. 12, 2007, pp. 6 total.

(Continued)

*Primary Examiner* — Haissa Philogene

(57) ABSTRACT

An intelligent light source converts color and luminous flux data to luminous flux levels of individual color sources and automatically compensates for variations in operating conditions.

25 Claims, 15 Drawing Sheets

U.S. PATENT DOCUMENTS

| | | | |
|---|---|---|---|
| 6,727,765 B1 | 4/2004 | Ess | |
| 6,734,875 B1 * | 5/2004 | Tokimoto et al. | 345/690 |
| 6,807,137 B2 | 10/2004 | Chuang | |
| 6,864,989 B2 | 3/2005 | Storz et al. | |
| 7,014,336 B1 * | 3/2006 | Ducharme et al. | 362/231 |
| 7,046,160 B2 | 5/2006 | Pederson et al. | |
| 7,095,439 B2 | 8/2006 | Hammadou | |
| 7,256,552 B2 | 8/2007 | Ishii et al. | |
| 7,319,298 B2 * | 1/2008 | Jungwirth et al. | 315/307 |
| 7,372,902 B2 * | 5/2008 | Matsushima | 375/238 |
| 7,573,210 B2 | 8/2009 | Ashdown et al. | |
| 7,689,130 B2 * | 3/2010 | Ashdown | 398/172 |
| 7,712,917 B2 * | 5/2010 | Roberts et al. | 362/227 |
| 7,868,562 B2 * | 1/2011 | Salsbury et al. | 315/307 |
| 7,915,838 B2 * | 3/2011 | VanEss | 315/302 |
| 2004/0001040 A1 | 1/2004 | Kardach et al. | |

OTHER PUBLICATIONS

USPTO Final Rejection for U.S. Appl. No. 11/598,981 dated Feb. 15, 2011; 11 pages.

USPTO Non-Final Rejection for U.S. Appl. No. 11/598,981 dated Aug. 31, 2010; 9 pages.

USPTO Non-Final Rejection for U.S. Appl. No. 11/598,981 dated Jul. 26, 2010; 9 pages.

USPTO Non-Final Rejection for U.S. Appl. No. 11/598,981 dated Feb. 3, 2010; 14 pages.

USPTO Notice of Allowance for U.S. Appl. No. 10/186,466 dated Dec. 5, 2003; 5 pages.

USPTO Non-Final Rejection for U.S. Appl. No. 10/186,466 dated Jul. 30, 2003; 5 pages.

USPTO Miscellaneous Action with SSP for U.S. Appl. No. 10/186,466 dated Aug. 7, 2002; 1 page.

USPTO Notice of Allowance for U.S. Appl. No. 08/825,359 dated Dec. 7, 1998; 1 page.

USPTO Non-Final Rejection for U.S. Appl. No. 08/825,359 dated Jul. 8, 1998; 11 pages.

USPTO Notice of Allowance for U.S. Appl. No. 08/828,325 dated Dec. 21, 1998; 13 pages.

USPTO Non-Final Rejection for U.S. Appl. No. 08/828,325 dated Sep. 4, 1998; 7 pages.

USPTO Notice of Allowance for U.S. Appl. No. 08/825,489 dated Dec. 17, 1998; 3 pages.

USPTO Non-Final Rejection for U.S. Appl. No. 08/825,489 dated Jul. 17, 1998; 14 pages.

* cited by examiner

800

| BIT 3 | BIT 4 | XOR OUTPUT |
|---|---|---|
| 0 | 0 | 0 |
| 0 | 1 | 1 |
| 1 | 0 | 1 |
| 1 | 1 | 0 |

| Sequence # | LFSR Bit Values | | | | Decimal Value |
|---|---|---|---|---|---|
| | Bit 1 | Bit 2 | Bit 3 | Bit 4 | |
| 1 | 0 | 0 | 1 | 1 | 3 |
| 2 | 0 | 0 | 0 | 1 | 1 |
| 3 | 1 | 0 | 0 | 0 | 8 |
| 4 | 0 | 1 | 0 | 0 | 4 |
| 5 | 0 | 0 | 1 | 0 | 2 |
| 6 | 1 | 0 | 0 | 1 | 9 |
| 7 | 1 | 1 | 0 | 0 | 12 |
| 8 | 0 | 1 | 1 | 0 | 6 |
| 9 | 1 | 0 | 1 | 1 | 11 |
| 10 | 0 | 1 | 0 | 1 | 5 |
| 11 | 1 | 0 | 1 | 0 | 10 |
| 12 | 1 | 1 | 0 | 1 | 13 |
| 13 | 1 | 1 | 1 | 0 | 14 |
| 14 | 1 | 1 | 1 | 1 | 15 |
| 15 | 0 | 1 | 1 | 1 | 7 |

METHOD AND APPARATUS FOR NETWORKED ILLUMINATION DEVICES

This application claims priority to U.S. Provisional Patent Application No. 60/898,473, filed Jan. 30, 2007. This application is related to U.S. patent application Ser. No. 11/598,981, filed Nov. 13, 2006.

TECHNICAL FIELD

The present invention relates to the control of one or more illumination devices and, in one embodiment, to a communication protocol that transmits data encoded with color information.

BACKGROUND

Light-emitting diode (LED) technology has advanced to the point where LEDs can be used as energy efficient replacements for conventional incandescent and/or fluorescent light sources. One application where LEDs have been employed is in ambient lighting systems using white and/or color (e.g., red, green and blue) LEDs. Like incandescent and fluorescent light sources, the average luminous flux of an LED's output is controlled by the average current through the device. Unlike incandescent and fluorescent light sources, however, LEDs can be switched on and off almost instantaneously. As a result, their luminous flux can be controlled by switching circuits that switch the device current between two current states to achieve a desired average current corresponding to a desired luminous flux. This approach can also be used to control the relative intensities of red, green and blue (RGB) LED sources (or any other set of colored LED sources) in ambient lighting systems that mix colored LEDs in different ratios to achieve a desired color.

One approach to LED switching is described in U.S. Pat. Nos. 6,016,038 and 6,150,774 of Meuller et al. These patents describe the control of different LEDs with square waves of uniform frequency but independent duty cycles, where the square wave frequency is uniform and the different duty cycles represent variations in the width of the square wave pulses. U.S. Pat. Nos. 6,016,038 and 6,150,774 describe this as pulse width modulation (PWM). This type of control signal has high spectral content at the uniform frequency and its odd harmonics, which can cause electromagnetic interference (EMI) to sensitive devices, components, circuits and systems nearby.

U.S. Pat. Nos. 6,016,038 and 6,150,774 also describe a conventional networked illumination system that utilizes a DMX512 protocol to address network data to multiple individually addressed microcontrollers from a central network controller. Using the DMX512 protocol, the relative luminous flux of each individual color in a light source is transmitted from a lighting controller to a light source, as illustrated in FIG. 1A.

In solid-state (LED) lighting, the luminous flux output of each LED at a given operating current decreases as the junction temperature of the LED increases. LED junction temperature can increase due to power dissipation in the LED and/or increases in ambient temperature. This effect, illustrated in the curves of FIG. 1B, can create both luminous flux errors and errors in color mixing because the magnitude of the effect is different for LEDs of different colors.

Another temperature effect in LEDs is a shift of the dominant wavelength of an LED as the junction temperature of the LED changes. Typically, the dominant wavelength increases as junction temperature increases, causing a red shift. This effect can cause additional color distortion independent of the luminous flux effects.

Another effect in LED lighting networks is LED aging. In general, the luminous flux of an LED decreases with accumulated operating time. The rate of decrease is different for different color LEDs and is affected by the operating current and temperature of the LED. This effect can cause luminous flux errors and color distortion independent of the other effects mentioned above.

BRIEF DESCRIPTION OF THE DRAWINGS

The present invention is illustrated by way of example and not by way of limitation in the figures of the accompanying drawings, in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

In the following description, reference may be made to colorimetry and lighting systems based on a red-green-blue (R/G/B) primary color system for convenience and ease of explanation. It will be appreciated that the methods and apparatus described herein are equally applicable to any other color system.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A networked lighting apparatus is described that, in one embodiment, includes a receiver to receive a commanded color point and/or luminous flux value, sensors and circuitry for determining 1) the junction temperatures of the LEDs, and/or 2) the output intensities of the LEDs, and/or 3) the output wavelengths of the LEDs, and/or 4) the accumulated operating time of the LEDs, and a processing device that controls the luminous flux of each LED using the commanded color point and/or luminous flux value, and the junction temperatures of the LEDs and/or intensities of the LEDs and/or the output wavelengths of the LEDs and/or the accumulated operating time of the LEDs.

In one embodiment, the method and apparatus described herein uses a lighting controller to transmit (command) a particular color point specific to a standard color chart and/or a luminous flux value. The luminous flux value may be expressed, for example, as an absolute luminous flux (e.g., in lumens) or as a relative luminous flux (e.g., 50% of a maximum level).

Figure 1A:
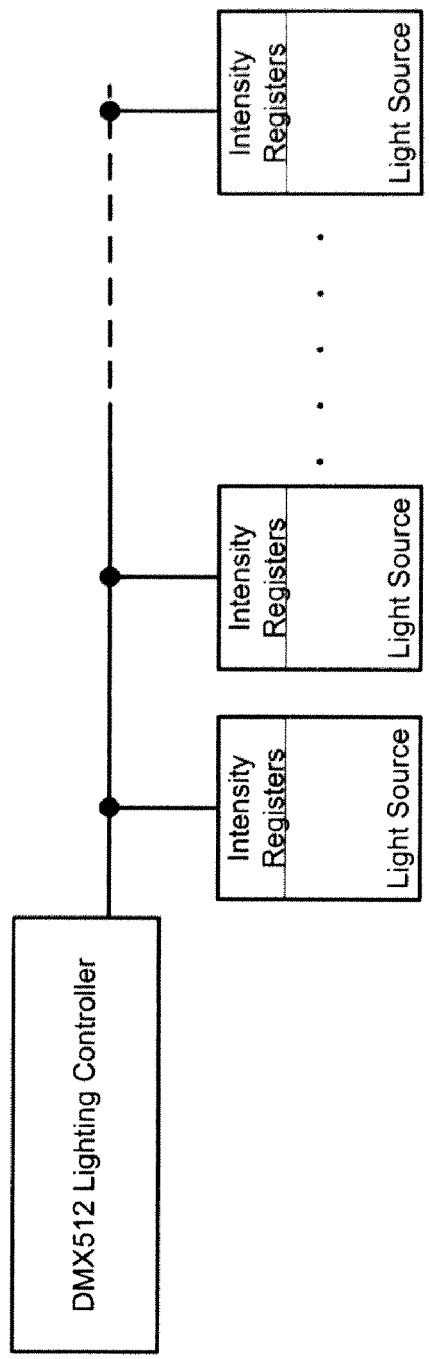
FIG. 1A illustrates a conventional DMX512 lighting network.
Figure 1B:
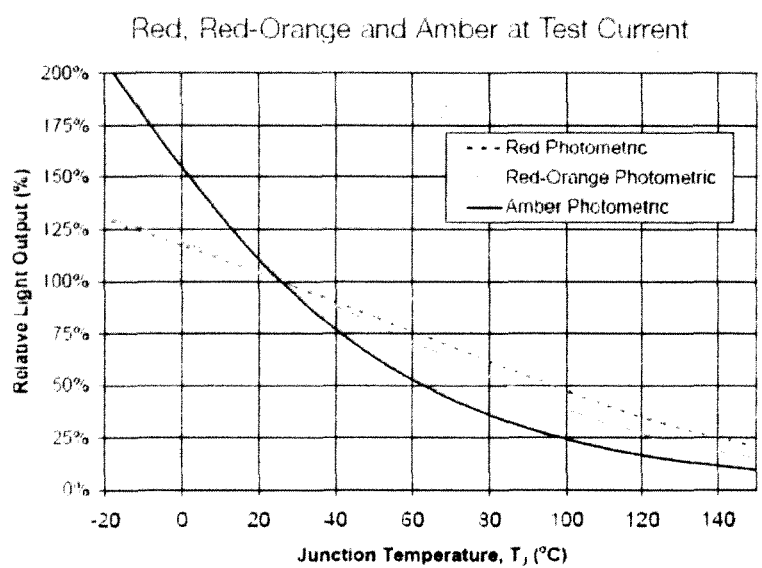
FIG. 1B illustrates the change in the luminous flux of LEDs in a conventional lighting network as the junction temperature of the LED changes.
Figure 2:
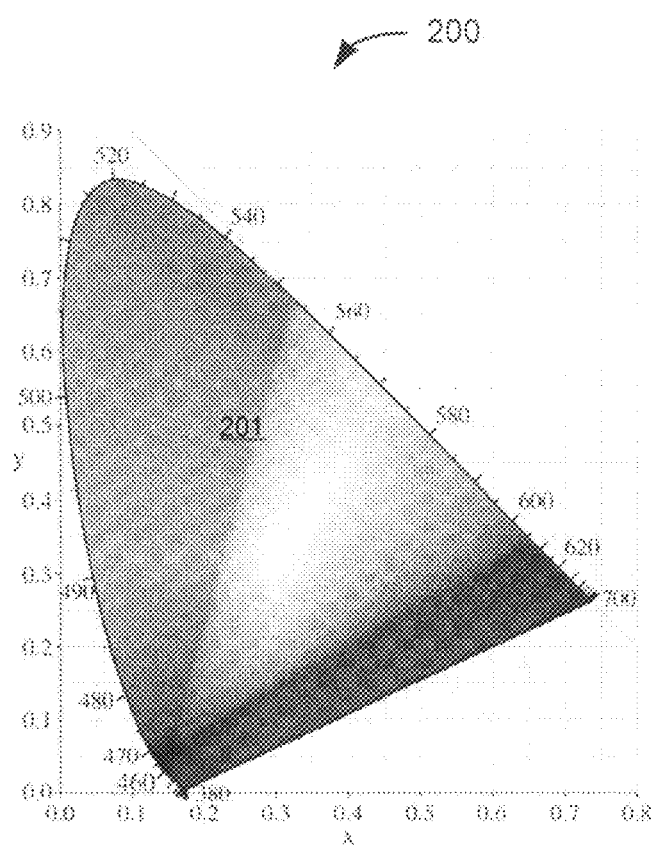
FIG. 2 illustrates a color chart.

An example of a standard color chart 200 (rendered in gray-scale for convenience of illustration) is illustrated in FIG. 2 for the CIE 1931 RGB chromaticity standard where every visible color point (represented by area 201) within a color gamut determined by a set of RGB LEDs, can be specified by an x-y coordinate pair corresponding to a specific R/G/B ratio. The luminous flux of a particular color point can be represented by a third coordinate (e.g., a z coordinate) normal to the plane of the color chart. In FIG. 2, the numbers around the perimeter of area 201 (ranging from 380 to 700) indicate the wavelengths (in nanometers) of monochromatic light sources corresponding to the respective point on the perimeter. The color point and luminous flux values may be represented by digital words of predetermined bit length that may be transmitted by a lighting controller and received by an intelligent light source device as described herein.

Figure 3:
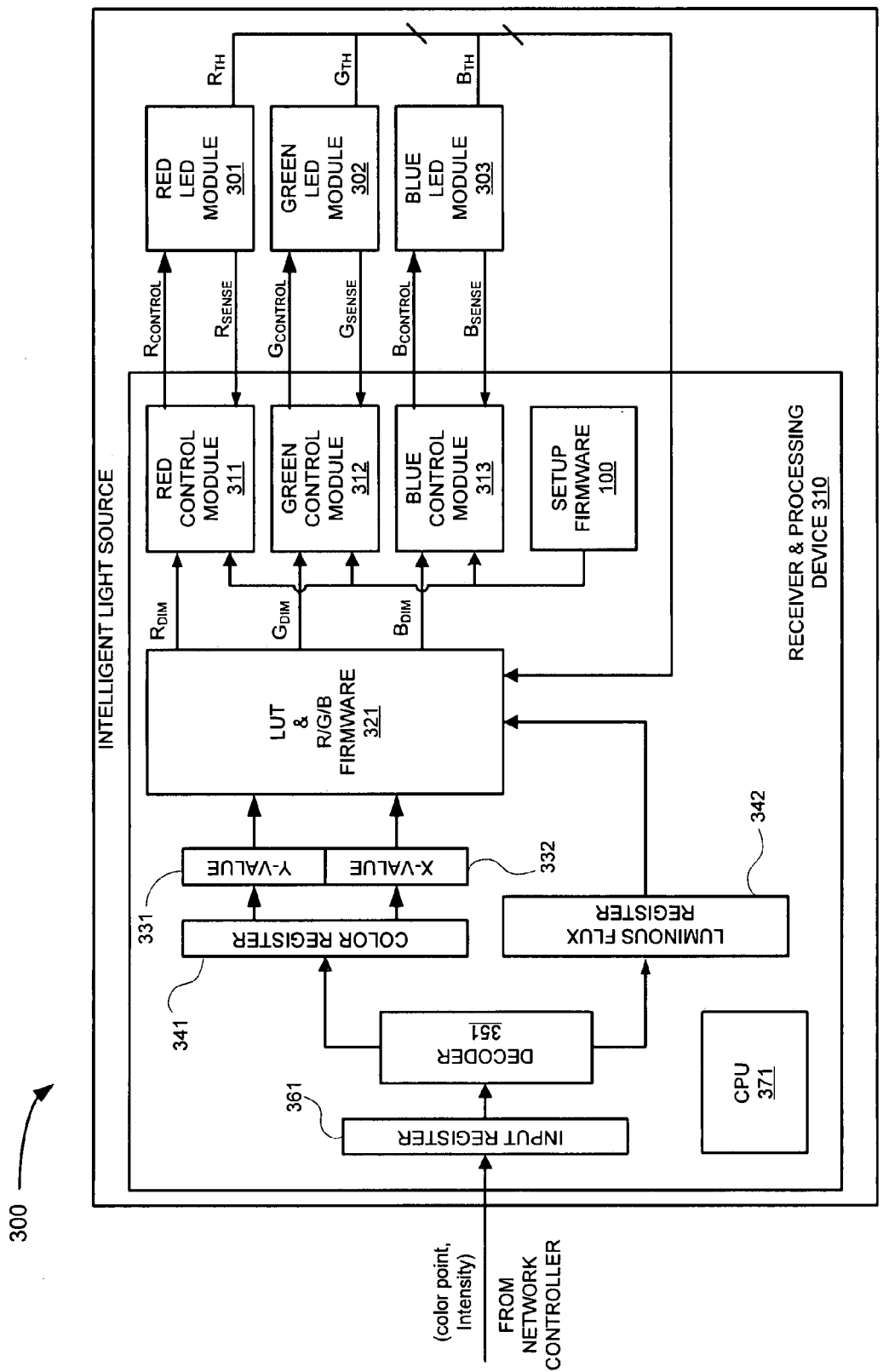
FIG. 3 illustrates one embodiment of an intelligent light source device.

FIG. 3 illustrates one embodiment of an intelligent light source device 300. In one embodiment, the intelligent light source device is composed of one or more illumination devices (e.g., red LED module 301, green LED module 302 and blue LED module 303), a receiver and processing device 310 including illumination device drivers (e.g., red control module 311, green control module 312 and blue control module 313). In one embodiment, the illumination devices may include environmental and/or optical sensors as described in greater detail below. In one embodiment, the processing device may be a microcontroller and may include a central processing unit (CPU) 371 to control the operations of the processing device 310. Alternatively, other types of processing devices may be used.

The intelligent light source device 300 may be capable of monitoring/measuring environmental variables such as junction temperature(s) and/or ambient temperature and/or LED operating age, and LED output parameters such as wavelength and/or luminous flux, and setting the correct luminous flux of each LED (or group of like-colored LEDs) to compensate for the environmental changes and output variations to achieve the desired color point and/or luminous flux commanded by the lighting controller. These monitoring/measuring and control functions may be achieved with various feedback control networks as described below.

The intelligent light source device 300 receives network data from a controller on the lighting network (not shown in FIG. 3) that specifies the coordinates of a color point in a standardized color space, and/or a corresponding total luminous flux of the light source. The color point and total luminous flux data are converted to control signals for different color LEDs such that the combined outputs of the LEDs produce the desired color and/or luminous flux. In one embodiment of the present invention, the lighting controller may be coupled to the intelligent light source device 300 using a wired communication protocol. Standard wired lighting protocols that may be used include, for example, DMX512 and RDM. In one embodiment, the intelligent light source device 300 may be coupled to the lighting controller using a wireless communication protocol such as Zigbee® or Wireless USB (WUSB), for example.

The network data (color point and/or total luminous flux) is received by an input register 361 in the intelligent light source device. The data is decoded in a decoder 351 and sent to respective color register 341 and total luminous flux register 342. The data in the color register is further separated into x and y coordinate values (in registers 332 and 331, respectively) of a standard color space, such as the CIE 1931 RGB color space. The x coordinate from register 332, the y coordinate from register 331, and the total luminous flux value from the total luminous flux register 342 may be sent to a lookup table (LUT) and/or color mixing stage (e.g., RGB color mixing) 321, which may be implemented as a firmware algorithm in the above referenced processing device. The x and y coordinates may provide entry points into the LUT as is known in the art. In the exemplary case of RGB color mixing, the LUT may generate digital RGB values, in a ratio (i.e., R::G::B) that corresponds to the color point, that may be used by the firmware algorithm in conjunction with the total luminous flux value to generate digital dimming values (e.g., absolute or relative luminous flux values) for each color LED module (e.g., $R_{DIM}$, $G_{DIM}$ and $B_{DIM}$), such that the combination will produce the desired overall color and total luminous flux. The digital dimming values are converted to analog control signals (e.g., $R_{CONTROL}$, $G_{CONTROL}$ and $B_{CONTROL}$) in a respective LED control module (e.g., red control module 311, green control module 312 and blue control module 313) that control the peak and average currents of the LED Modules (e.g., red, green and blue LED modules 301, 302 and 303) as described below. Current and voltage sensing in each LED module may provide feedback (e.g., $R_{SENSE}$, $G_{SENSE}$ and $B_{SENSE}$) to its respective control module to maintain the required peak current values. As described in greater detail below, a setup firmware module 100 may provide setup values to control modules 311-313 that configure the operation of the control modules. The setup values may include peak current values for the LED modules and initial values for pseudorandom number generators in the LED control modules as described below. In one embodiment, the setup firmware may be a one-time programmable (OTP) module that may be externally programmed during an initial setup operation of the intelligent light source device 300. In one embodiment, the setup firmware may be reprogrammable.

Figure 4A:
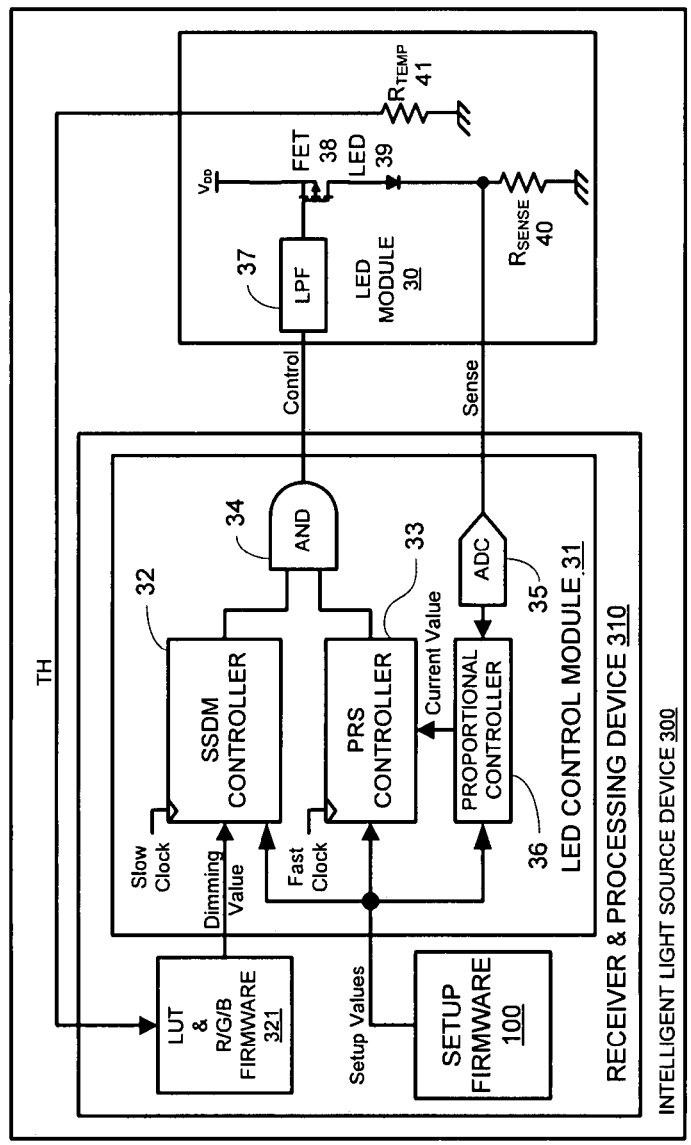
FIG. 4A illustrates an LED control module and an LED module with associated circuitry of an intelligent light source device in one embodiment of the present invention.

FIG. 4A illustrates an exemplary LED module 30 and an exemplary LED control module 31 with associated circuitry of an intelligent light source device according to one embodiment of the present invention. In this embodiment, the LED control module 31 includes a stochastic signal density modulation (SSDM) dimming circuit ("SSDM Controller") 32 that receives a digital dimming value from the LUT and R/G/B firmware 321 and generates a waveform that controls the average LED current of LED 39 in LED module 30. In this embodiment, the LED control module 31 also includes a pseudorandom sequence (PRS) current control circuit ("PRS Controller") 33 that generates a waveform to control the peak current in LED 39. The SSDM Controller 32 and the PRS Controller 33 are programmed with waveform setup values by the setup firmware 100 during an initial setup operation as described in greater detail below. The LED control module also includes a Proportional Controller 36 that may be programmed with a peak current value by the setup firmware 100 during the initial setup operation. The Proportional Controller 36 may be connected to an analog-to-digital converter (ADC) 35 that digitizes a SENSE signal (e.g., $R_{SENSE}$, $G_{SENSE}$ and/or $B_{SENSE}$) from the LED module 30, which may be an LED current sensing voltage, in a feedback control circuit, described below.

The outputs of the SSDM Controller 32 and the PRS Controller 33 may be logically AND'd by AND gate 34 and passed through a lowpass filter/biasing network (LPF) 37 to generate a control signal that is used to control and modulate current in LED 39. The SSDM controller 32 may be clocked at a 'slow' clock frequency (e.g., a kilohertz rate) that is below a nominal cutoff frequency of the LPF 37. The PRS Controller may be clocked at a 'fast' clock frequency (e.g., a megahertz rate) that is above the nominal cutoff frequency of the LPF. As described below, the outputs of both the SSDM Controller 32 and the PRS Controller 33 may be stochastic and characterized by spread-spectrum (i.e., non-uniform frequency) waveforms.

Figure 5:
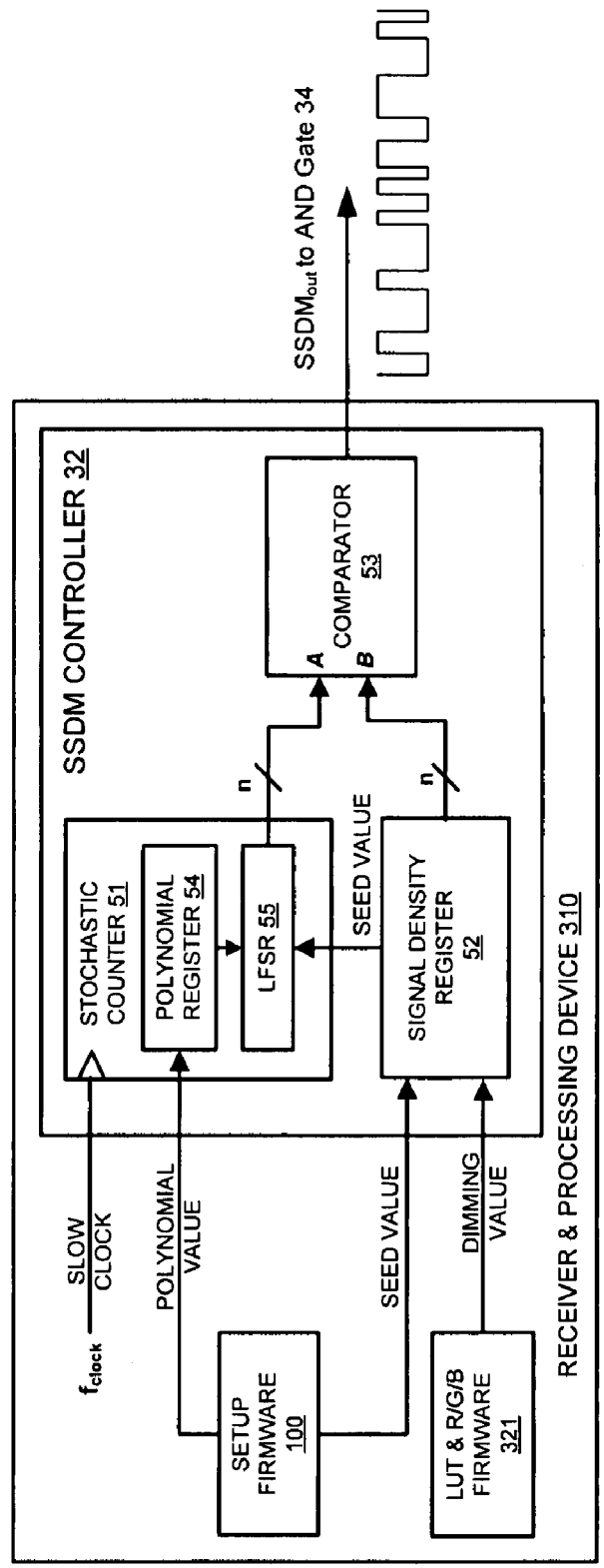
FIG. 5 is a functional block diagram illustrating an SSDM Controller and associated circuitry of an intelligent light source device according to one embodiment of the present invention.
Figure 6:
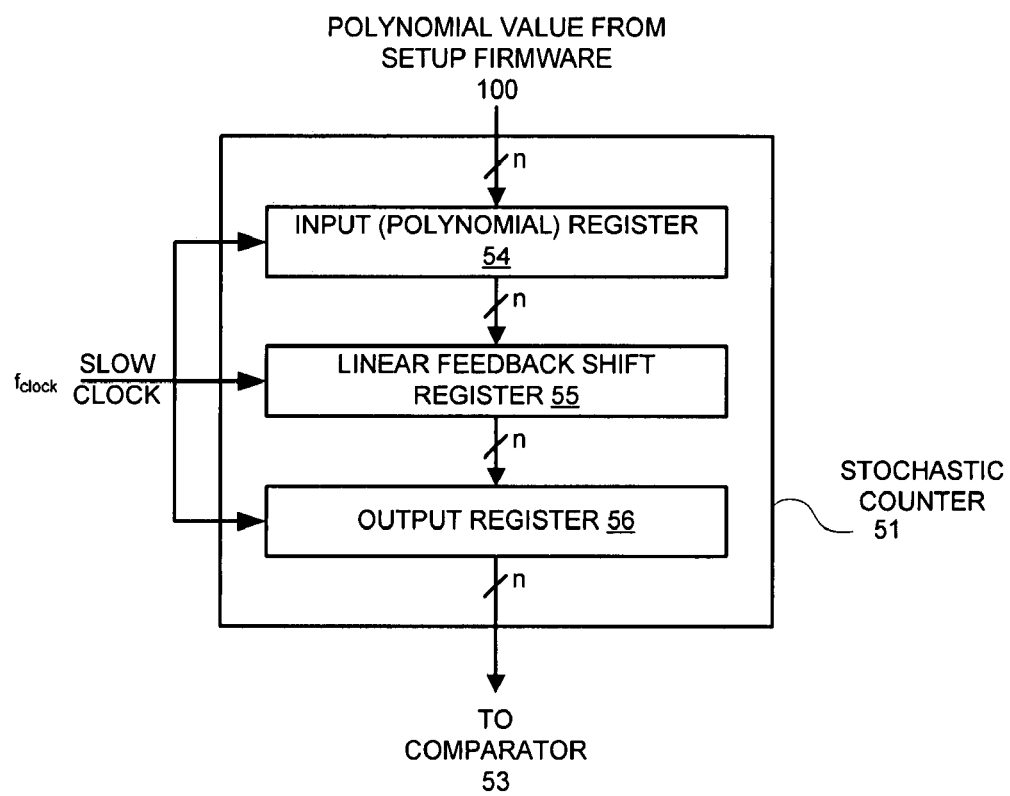
FIG. 6 is a functional block diagram illustrating one embodiment of a stochastic counter.

FIG. 5 is a functional block diagram illustrating one embodiment of the SSDM Controller and associated circuitry of the intelligent light source device 300. The SSDM Controller 32 includes an n-bit stochastic counter 51, an n-bit signal density register 52 and a comparator 53. FIG. 6 is a functional block diagram illustrating one embodiment of stochastic counter 51. The stochastic counter 51 includes the n-bit polynomial register 54 that receives a setup value (polynomial value) from the setup firmware 100, as described above. Stochastic counter 51 may also include an n-bit linear feedback shift register (LFSR) 55 configured as an n-bit pseudorandom number generator that generates pseudorandom numbers between 1 and $2^n-1$ at a rate equal to $f_{clock}$ (where $f_{clock}$=slow clock). Stochastic counter 51 may also include an output register 56 to hold the pseudorandom number outputs of LFSR 55 for comparison with an output of signal density register 52 as described below.

The polynomial value in the polynomial register 54 configures the linear feedback shift register (LFSR) 55 and initializes (seeds) the pseudorandom sequence that is generated by the LFSR 55. The polynomial value may be programmed into the setup firmware 100 during an initial setup operation.

The value in the polynomial register 54 corresponds to the coefficients of a polynomial equation that configures the LFSR 55. A linear feedback shift register, in one embodiment, is a shift register with tap points and one or more exclusive-or (XOR) gates that determine the next value in the shift register when the register is clocked by a clock signal, such as $f_{clock}$.

Figure 7:
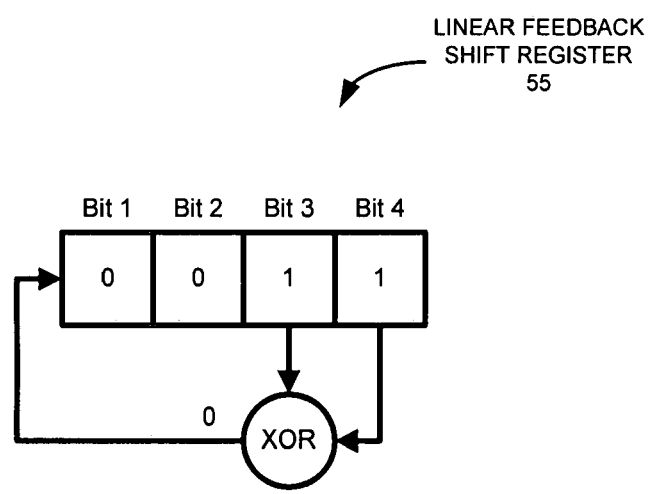
FIG. 7 illustrates an example of a 4-bit LFSR configured with the polynomial equation $1x^4+1x^3+0x^2+0x+1$ ($=x^4+x^3+1$), according to one embodiment of the present invention.
Figure 8:
FIG. 8 is an exemplary truth table illustrating the output of an XOR gate as a function of its inputs, according to one embodiment of the present invention.

For example, a 4-bit LFSR is characterized by a polynomial equation of the form $ax^4+bx^3+cx^2+dx+1$, where a, b, c, and d are equal to either 1 or 0. A coefficient of 1 for the $x^n$ term indicates that the $n^{th}$ bit position in the shift register is tapped. Conversely, a coefficient of 0 indicates that the corresponding bit position is not tapped. FIG. 7 illustrate an example of a 4-bit LFSR configured with the polynomial equation $1x^4+1x^3+0x^2+0x+1$ ($=x^4+x^3+1$), according to one embodiment of the present invention. The output of the XOR gate is a function of its inputs from Bit 3 and Bit 4, according to the truth table illustrated in FIG. 8.

Figure 9:
FIG. 9 is a table illustrating the sequence of register values in the example 4-bit LFSR with the exemplary configuration and initial conditions, according to one embodiment of the present invention.

Each time the LFSR is clocked, bits 1 and 2 are shifted right, bit 3 is shifted to the XOR gate, the XOR value is shifted to bit 4 and bit 4 is fed back to the XOR gate and to bit 1. The pseudorandom number generator is initialized with a seed value that is provided by the setup firmware 100 through the signal density register 52. FIG. 9 is a table illustrating the sequence of register values (Bits 1-4) in the example 4-bit LFSR with the exemplary configuration and initial conditions corresponding to a polynomial value of [0,0,1,1] and a seed value of [0,0,0,1].

Figure 10A:
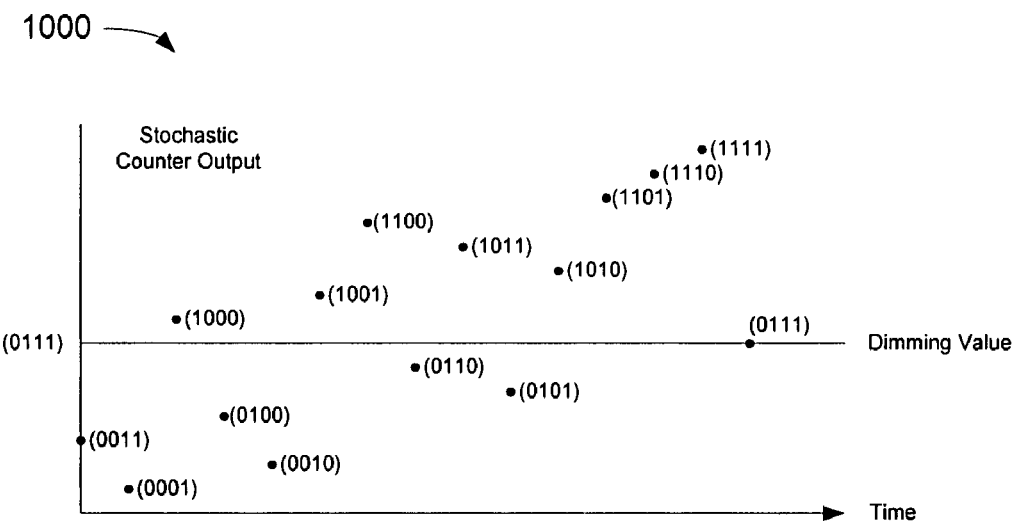
FIG. 10A illustrates an exemplary output of a stochastic counter over one period, according to one embodiment of the present invention.
Figure 10B:
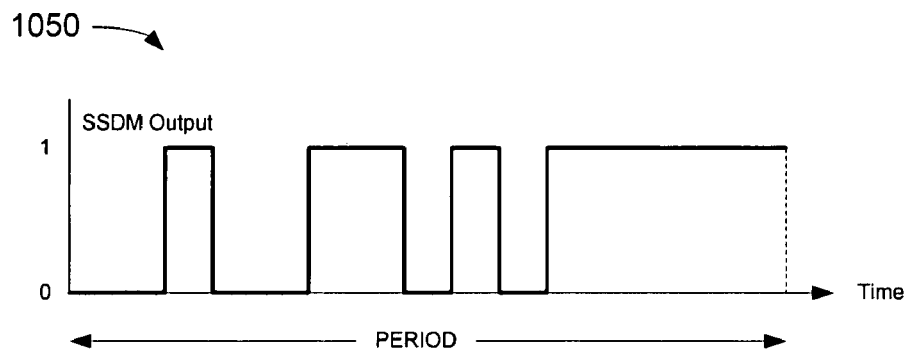
FIG. 10B illustrates an exemplary output of an SSDM Controller over one period, according to one embodiment of the present invention.

Each time the state of the LFSR 55 changes, the new value is transferred to the output register 56, where it is compared with an n-bit dimming value in the signal density register 52. The signal density register 52 in the SSDM Controller receives the n-bit dimming value between 0 and $2^n-1$ from the LUT and R/G/B firmware 321, which represents a desired average value (e.g., in the range of 0% to 100%) of the output waveform of the SSDM Controller 32 corresponding to an average LED current (e.g. through LED 39). The n-bit dimming value in the signal density register 52 is compared with the n-bit output of the stochastic counter 51. When the output value of the stochastic counter 51 is at or above the output value of the signal density register 52, the output of the comparator 53 is in a first state (e.g., a logical "1"). When the output value of the stochastic counter 51 is below the output value of the signal density register 52, the output of the comparator is in a second state (e.g., a logical "0"). It will be appreciated that different definitions of "first state" and "second state" are possible, depending on a particular choice of logic notation, without affecting the principles of operation of the present invention. As a result, the output of the comparator is a stochastic (pseudorandom) waveform with a code length of $2^n-1$, a clock rate of $f_{clock}$=slow clock, and a period of $2^n/f_{clock}$. For the exemplary 4-bit LFSR described above, the output 1000 of the stochastic counter 51 over one full period of operation is illustrated in FIG. 10A. Assuming, for example, that the dimming value in the signal density register 52 is 7 (binary 0111, shown as a line in FIG. 10A), the output of the SSDM Controller 32 would have the values over one period as illustrated by waveform 1050 in FIG. 10B.

As illustrated in FIG. 10A, the output of the stochastic counter 51 has a uniformly distributed pseudorandom output and the SSDM output waveform of the SSDM Controller 32 has a multiplicity of pseudorandom pulse widths within each period. As a result, the spectral content of the output of the SSDM Controller 32 is distributed (i.e., has a non-uniform frequency). The average value of the SSDM output 1050 is determined by the dimming value in the signal density register 52.

Figure 11:
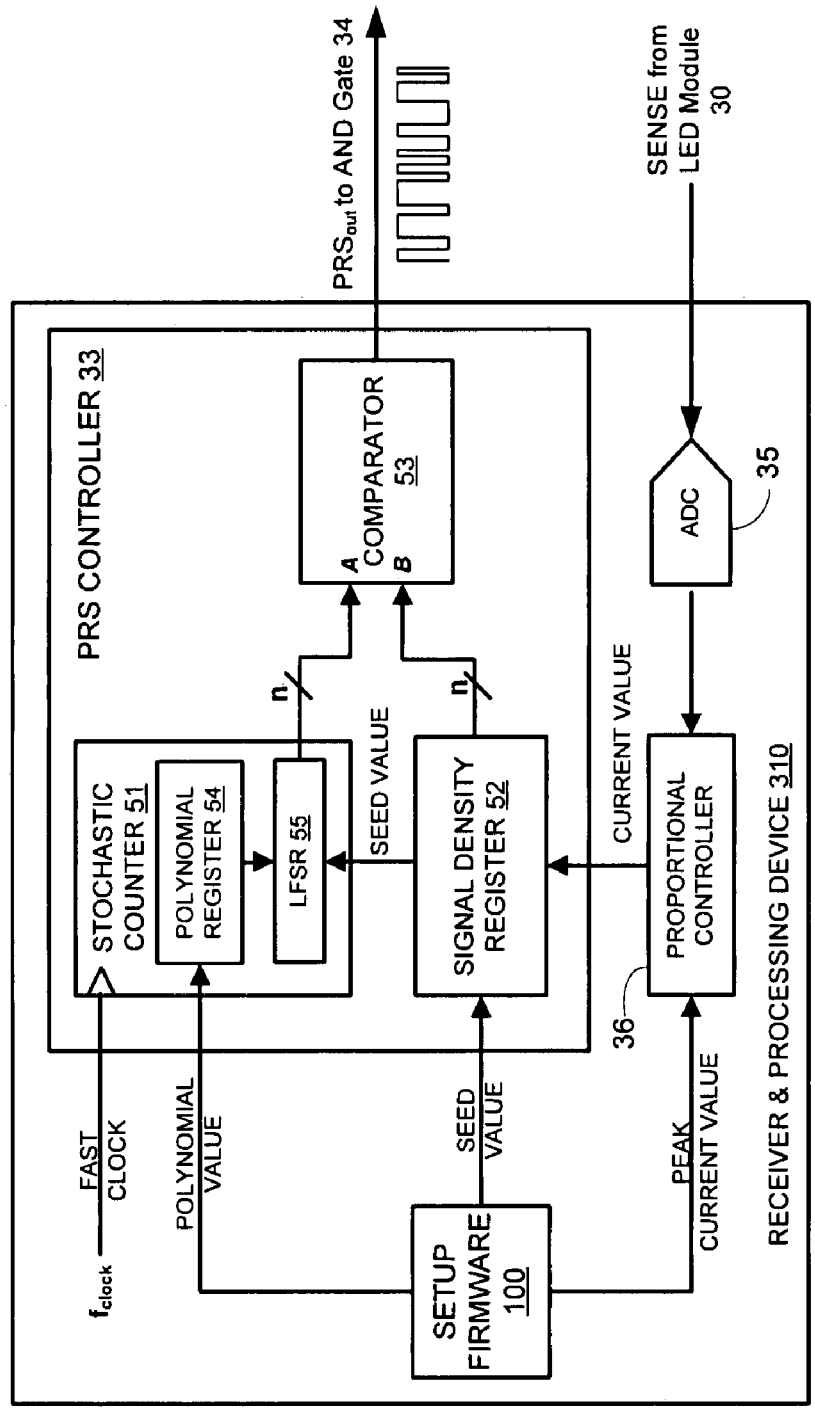
FIG. 11 is a functional block diagram illustrating a PRS Controller and associated circuitry of an intelligent light source device according to one embodiment of the present invention.
Figure 12:
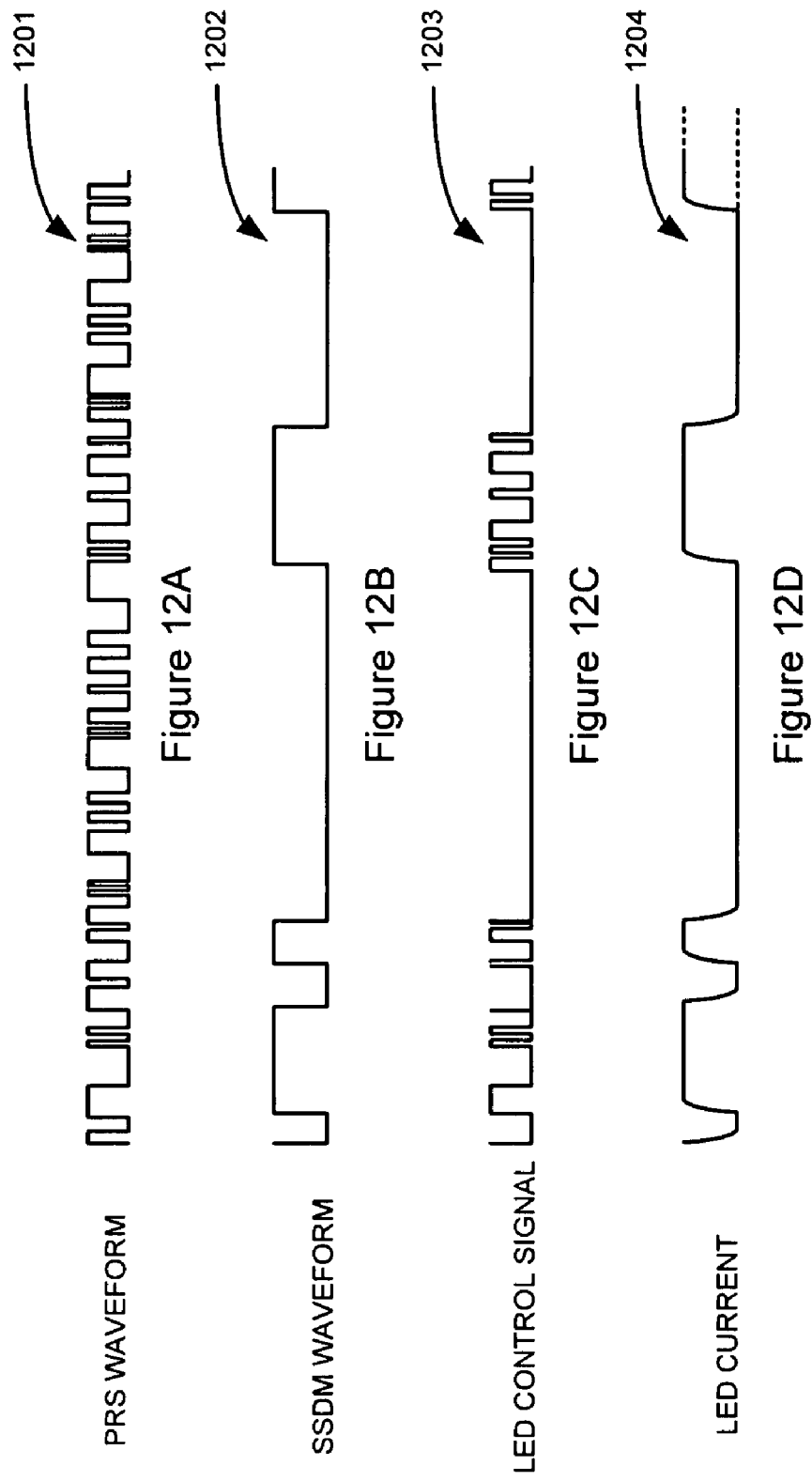
FIG. 12A illustrates a representative waveform of the PRS controller in one embodiment.
FIG. 12B illustrates a representative waveform of the SSDM controller in one embodiment.
FIG. 12C illustrates a representative waveform of a resultant LED control signal at the input to the LPF of an LED module in one embodiment.
FIG. 12D illustrates a representative waveform of a resultant LED current in one embodiment.

FIG. 11 is a functional block diagram illustrating one embodiment of PRS Controller 33 and associated circuitry in the intelligent light source device 300. The PRS Controller 33 includes separate instances of an n-bit stochastic counter 51, an n-bit signal density register 52 and a comparator 53 as described above with respect to the SSDM Controller 32, which may have equivalent structure and function, but may generate different values depending on, for example, a particular polynomial or other programming variable (e.g. a peak current value as described below). It will be appreciated that while the stochastic counter 51 in SSDM Controller 32 may be structurally equivalent to the stochastic counter in PRS Controller 33, the two stochastic counters may be clocked at different clock rates (e.g., "fast clock" and "slow clock") and can be independently programmed with different polynomial values and seed values during the initial setup operation.

The signal density register 52 in the PRS Controller 33 contains an n-bit current value between 0 and $2^n-1$, which represents a desired average value (e.g., 0% to 100%) of the output waveform of the PRS Controller 33 corresponding to a peak LED current (e.g., through LED 39). The n-bit current value in the signal density register is set by the Proportional Controller 36, which is programmed with a peak current value by the setup firmware 100 during the initial setup operation, as one of the setup values. In one embodiment, as in the case of the polynomial values, the peak current is only programmed into the Proportional Controller a single time.

In operation, the Proportional Controller 36 compares a programmed n-bit peak current value with the output of ADC 35. The output of ADC 35 is a digital representation of an analog sense voltage from LED Module 30 that is proportional to LED peak current. If the output value of the ADC 35 is below the n-bit peak current value in the Proportional Controller 36, the Proportional Controller 36 increases the n-bit current value in the signal density register 52. If the output value of the ADC 35 is above the n-bit peak current value, then the Proportional Controller 36 decreases the n-bit current value in the signal density register 52.

The n-bit current value in the signal density register 52 (which is set by Proportional controller 36) is compared with the n-bit output of the stochastic counter 51. When the output value of the stochastic counter 51 is at or above the value in the signal density register 52, the output of the comparator 53 is in a first state. When the output value of the stochastic counter 51 is below the value in the signal density register 52, the output of the comparator 53 is in a second state. Note that the comments above with respect to the SSDM Controller and the arbitrary definition of logic states applies equally to the PRS Controller, here.

As a result, the output of the comparator 53 in PRS Controller 33 is a stochastic (pseudorandom) waveform with a code length of $2^n-1$, a clock rate of $f_{clock}$=fast clock, and a period of $2^n/f_{clock}$. As in the case of the SSDM Controller 32, the waveform has a multiplicity of pseudorandom pulse widths within each period and a distributed, non-uniform frequency content with a higher average frequency due to the increased clock rate.

As described above (referring to FIG. 4A), the output waveform of the SSDM Controller 32 and the output waveform of the PRS Controller 33 are logically AND'd by AND-gate 34 to generate an LED control signal. In one embodiment, the LED control signal may be connected to the gate of a MOSFET 38 (or other current control element as is known in the art) through a lowpass filter (LPF) 37. The drain of the MOSFET 38 is connected to a power source $V_{DD}$, and the source terminal of the MOSFET 38 is connected to the anode of LED 39 (LED 39 may be a single LED in one embodiment or some series-parallel combination of LEDs having an anodic terminal connected to the source terminal of MOSFET 38). The cathode of the LED (or the cathodic terminal of a combination of LEDs) is coupled to ground through a current sensing resistor $R_{SENSE}$ 40.

The voltage developed across $R_{SENSE}$ 40 is proportional to the current through LED 39 and may be used in a feedback loop through ADC 35. The MOSFET 38 that controls the LED current is located between the power supply and the anode of LED 39. In this configuration, the MOSFET 38 operates as a current source for LED 39 and the cathode of LED 39 can be referenced to ground through the sense resistor $R_{SENSE}$ 40. As described above, this allows the peak current through LED 39 to be controlled via the feedback of a sense voltage to ADC 35 in LED Control Module 31 in intelligent light source device 300.

In one embodiment, a thermistor $R_{TEMP}$ 41 may be thermally coupled with LED 39 (via a known thermal resistance and/or thermal time constant) such that the temperature of $R_{TEMP}$ 41 and the junction temperature of LED 39 have a known relationship. The resistance of $R_{TEMP}$ 41 is proportional to the temperature of LED 39 and may be used, with the LED current and forward voltage sensing, to determine the junction temperature of the LED. A signal (TH) from $R_{TEMP}$ 41 may be used by the R/G/B Firmware 321 to compensate the R, G and B SSDM dimming values for luminous flux changes due to temperature to maintain the required intensities of the LED modules (i.e., at the correct ratio to maintain color and at the correct luminous flux levels to maintain total luminous flux).

Figure 4B:
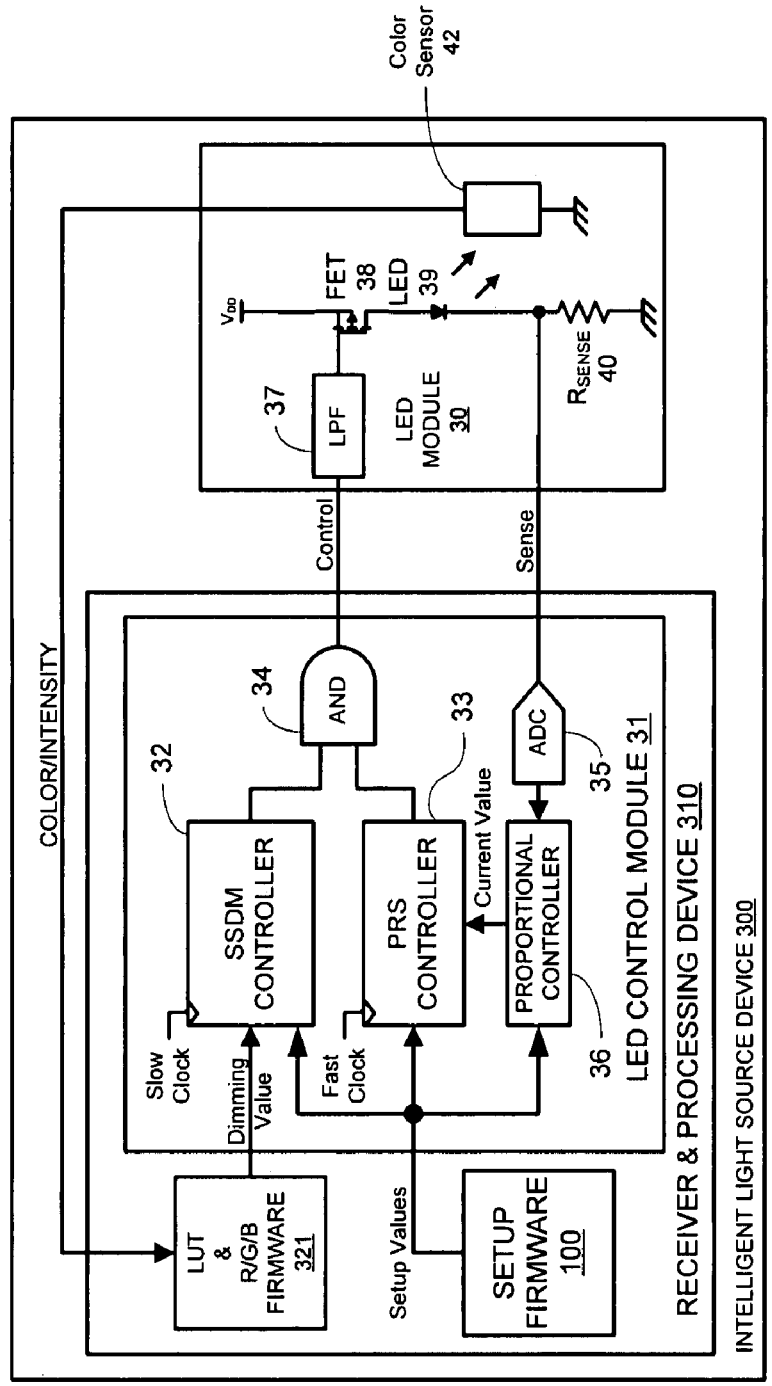
FIG. 4B illustrates an LED control module and an LED module with associated circuitry of an intelligent light source device in another embodiment of the present invention.

In one embodiment, as illustrated in FIG. 4B, LED Module 30 may include a Color Sensor 42, which may be optically coupled to LED 39 (e.g., via a fiber optic light pipe or other means for optical coupling as is known in the art). Color sensor 42 may be, for example, a single-channel or multi-channel color sensor (e.g., a TCS230 color sensor manufactured by Texas Advanced Optoelectronic Solutions), which may have one or more color filtered channels (e.g., red, green, blue and clear) that may generate a COLOR signal indicative of the red, green and blue content of an LED output, as well as an unfiltered channel to generate an LUMINOUS FLUX signal indicative of the luminous flux of the LED output irrespective of color. The COLOR/LUMINOUS FLUX signal output of color sensor 42 may be fed back to the LUT and RGB firmware 321 for correction of the dimming values provided to SSDM controller 32 to compensate for temperature and aging effects on the dominant wavelength and luminous flux of the LEDs described above.

In operation, the control signal output of LED control Module 31 may be viewed as the superposition of the output waveform of PRS Controller 33 ("PRS waveform") and the output waveform of SSDM Controller 32 "SSDM waveform"). The PRS waveform is lowpass filtered by LPF 37 to produce a control voltage that sets the linear operating point of MOSFET 38 to establish the peak current through the LED. The SSDM waveform, being below the cutoff frequency of LPF 37, passes through LPF 37 without filtering and operates as a switching control voltage that at the gate of MOSFET 38 that sets the average current through LED 39. Additionally, the location of MOSFET 38 with respect to LED 39 makes it easier to turn the MOSFET 38 on and off because the control voltage at the gate of the MOSFET switch does not have to overcome a large source voltage.

FIG. 12A-12D illustrate representative waveforms 1201 of the PRS Controller 33 (FIG. 12A), 1202 of the SSDM Controller 32 (FIG. 12B), 1203 of the resultant LED control signal at the input to the LPF (FIG. 12C) and 1204 of the LED current waveform (FIG. 12D), according to one embodiment of the present invention. It should be noted that the relative frequencies and pulse widths of he waveforms are not shown to scale for ease of illustration.

Figure 13:
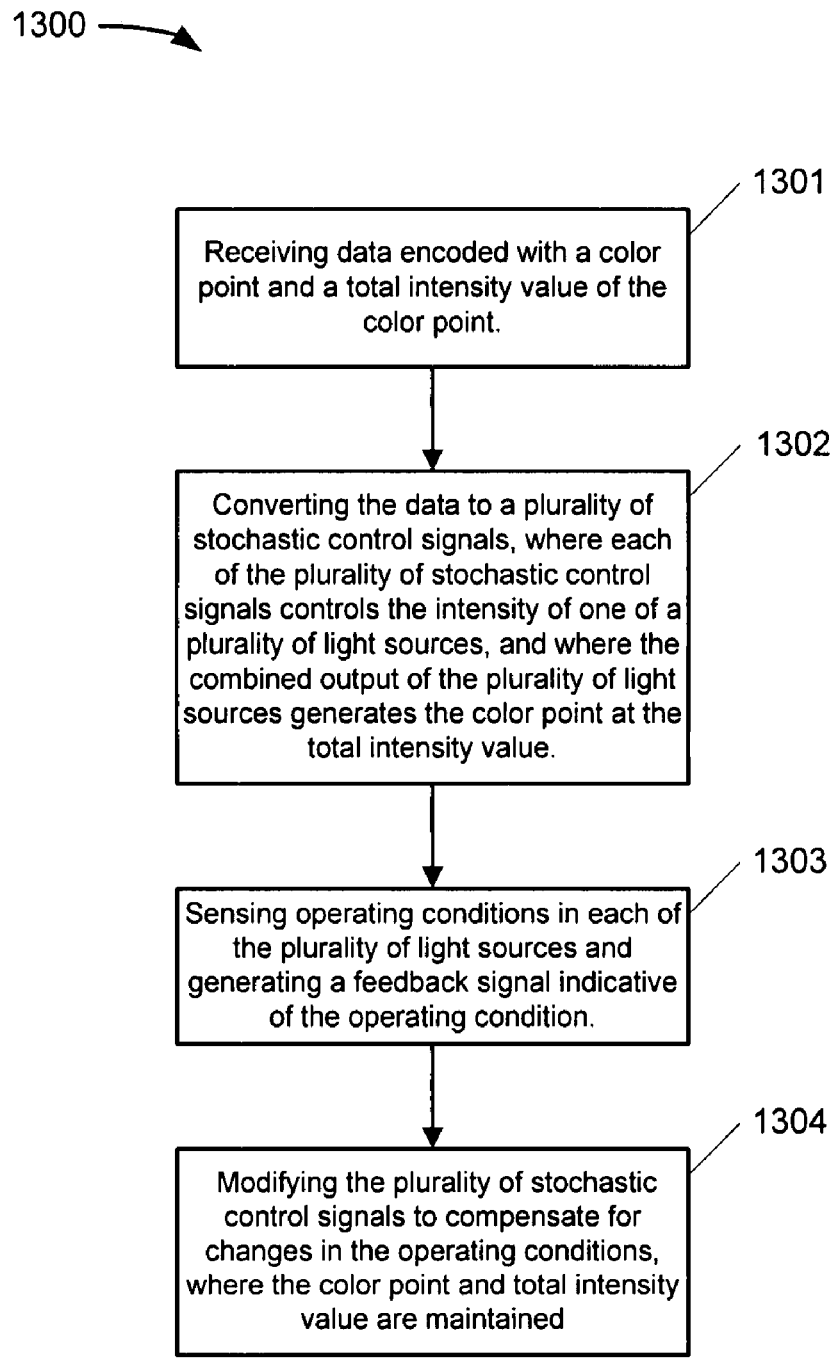
FIG. 13 is a flow chart that illustrates an embodiment of a method for controlling a networked illumination device.

FIG. 13 is a flowchart illustrating a method 1300 for controlling a networked illumination device in one embodiment. The method begins by receiving data (e.g., from a network controller) encoded with a color point and a total luminous flux value of the color point (operation 1301). Next, the data is converted to a plurality of stochastic control signals, where each of the plurality of stochastic control signals controls the luminous flux of one of a plurality of light sources, and where the combined output of the plurality of light sources generates the color point at the total luminous flux value (operation 1302). Next, each of the plurality of light sources senses operating conditions (e.g., temperature) and generates a feedback signal indicative of the operating condition (operation 1303). Lastly, in response to the feedback signals from the light modules, each of the plurality of control modules modifies its stochastic control signals to compensate for changes in the operating conditions, such that the color point and luminous flux value are maintained (operation 1304).

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
receiving data encoded with a color point; and
converting the data to a plurality of control signals, wherein each of the plurality of control signals controls a luminous flux of one of a plurality of light sources relative to other ones of the plurality of light sources, wherein a combined output of the plurality of light sources generates the color point, wherein the data is further encoded with a total luminous flux value;
converting the data to modify the plurality of control signals, wherein each of the plurality of control signals controls an absolute luminous flux of one of the plurality of light sources, wherein the combined output of the plurality of light sources generates the total luminous flux value, wherein converting the data to modify the plurality of control signals comprises:
decoding the data into data representative of the color point and data representative of the total luminous flux value; and
separating the data representative of the color point into a first coordinate and a second coordinate, wherein the first coordinate and the second coordinate correspond to the color point on a standard color chart.

2. The method of claim 1, further comprising:
programming a peak luminous flux value for each of the plurality of light sources; and
programming a pseudorandom sequence for each of the first stochastic signal and the second stochastic signal for each of the plurality of light sources.

3. The method of claim 1, wherein each of the plurality of control signals comprises:
a first stochastic signal of non-uniform frequency to control an average luminous flux of a corresponding one of the plurality of light sources; and
a second stochastic signal of non-uniform frequency to control a peak luminous flux of the corresponding one of the plurality of light sources.

4. The method of claim 1, further comprising:
sensing an operating condition in each of the plurality of light sources; and
modifying the plurality of control signals to compensate for changes in the operating condition, wherein one or more of the color point and the total luminous flux value generated by the plurality of light sources are maintained.

5. The method of claim 4, wherein the operating condition comprises a junction temperature of one or more of the plurality of light sources.

6. The method of claim 1, further comprising:
sensing an operating parameter in each of the plurality of light sources; and
modifying the plurality of control signals to compensate for changes in the operating parameter, wherein one or more of the color point and the total luminous flux value generated by the plurality of light sources are maintained.

7. The method of claim 6, wherein the operating parameter comprises one or more of a dominant wavelength and an luminous flux of one or more of the plurality of light sources.

8. The method of claim 1, wherein the first coordinate and the second coordinate comprise entry points to a lookup table, wherein an output of the lookup table comprises a ratio of intensities of the plurality of light sources corresponding to the color point.

9. The method of claim 8, wherein the total luminous flux value determines an average luminous flux of each of the plurality of light sources.

10. A system, comprising:
a network controller configured to generate control data encoded with a color point and a total luminous flux value; and
a light source coupled to the network controller, the light source comprising a plurality of differently colored lighting modules, the light source configured to receive and decode the control data and to convert the control data into a plurality of stochastic control signals to control luminous flux of the plurality of differently colored light modules, wherein the light source generates the color point at the total luminous flux value.

11. The system of claim 10, wherein the light source is coupled to the network controller via one of a wired connection and a wireless connection.

12. An apparatus comprising:
a receiving and processing device configured to receive data encoded with a color point and a total luminous flux value of the color point and to convert the data to a plurality of stochastic control signals to control intensities of a plurality of light sources to generate the color point at the total luminous flux value, wherein the plurality of light sources are coupled with the receiving and processing device, wherein each of the plurality of control signals comprises:
a first stochastic signal of non-uniform frequency to control an average luminous flux of a corresponding one of the plurality of light sources.

13. The apparatus of claim 12, wherein each of the plurality of light sources includes a lowpass filter to separate the first stochastic signal from the second stochastic signal.

14. The apparatus of claim 12, wherein each of the plurality of control signals further comprises a second stochastic signal of non-uniform frequency to control a peak luminous flux of the corresponding one of the plurality of light sources, and wherein the receiving and processing device comprises a plurality of control modules, corresponding to the plurality of light sources, to generate the first and second stochastic signals.

15. The apparatus of claim 14,
wherein each of the plurality of light sources is configured to sense a parameter indicative of a change in an operating condition in the light source and to generate a feedback signal indicative of the operating condition; and
wherein each of the corresponding control modules is configured to adjust a density of the second stochastic signal to compensate for the change in the operating condition.

16. The apparatus of claim 15, wherein the operating condition is a junction temperature of an LED light source.

17. The apparatus of claim 14,
wherein each of the plurality of light sources is configured to sense a change in an operating parameter of the light source and to generate a feedback signal indicative of the operating parameter; and
wherein each of the corresponding control modules is configured to adjust a density of the second stochastic signal to compensate for the change in the operating parameter.

18. The apparatus of claim 17, wherein the operating parameter is one of a dominant wavelength of the light source and a luminous flux of the light source.

19. The apparatus of claim 12, wherein to convert the data to the plurality of stochastic control signals, the receiving and processing device is configured to:
decode the data into data representative of the color point and data representative of the total luminous flux value; and
separate the data representative of the color point into a first coordinate and a second coordinate, wherein the first coordinate and the second coordinate correspond to the color point on a standard color chart.

20. The apparatus of claim 19, wherein the receiving and processing device further comprises a lookup table, wherein the first coordinate and the second coordinate comprise entry points to the lookup table, and wherein an output of the lookup table comprises signals indicative of an average luminous flux of each of the plurality of light sources and signals indicative of a relative luminous flux of each of the plurality of light sources.

21. The apparatus of claim 20, wherein the signals indicative of the average luminous fluxes of each of the plurality of light sources are modified by the data representative of the total luminous flux value to determine a total luminous flux of the plurality of light sources.

22. The apparatus of claim 20, wherein the signals indicative of the relative luminous flux of each of the plurality of light sources are modified by the data representative of the color point to generate the color point.

23. The apparatus of claim 20, wherein each of the plurality of control modules is configured to receive a dimming signal corresponding to the average luminous flux and the relative luminous flux of a corresponding light source.

24. The apparatus of claim 14, wherein each of the plurality of control modules comprises:
a stochastic signal density modulation (SSDM) controller to generate the first stochastic signal of non-uniform frequency;
a pseudo-random sequence (PRS) controller to generate the second stochastic signal of non-uniform frequency; and
means for combining the first and second stochastic signals in a control signal to control the corresponding one of the plurality of light sources.

25. The apparatus of claim 24, wherein the SSDM controller and the PRS controller comprise:
a stochastic counter to generate a pseudorandom sequence;
a signal density register to hold a signal density value; and
a comparator coupled with the stochastic counter and the signal density register to compare a value of the pseudorandom sequence with the signal density value and to generate one of an SSDM waveform and a PRS waveform.

* * * * *